United States Patent [19]

Ikegami et al.

[11] Patent Number: 5,249,427

[45] Date of Patent: Oct. 5, 1993

[54] METHOD AND DEVICE FOR COOLING COATED WIRE

[75] Inventors: Yoshio Ikegami; Tadashi Kouge; Shiro Kishi; Toshiaki Akita; Naoyuki Tashiro, all of Kobe, Japan

[73] Assignee: Kabushiki Kaisha Kobe Seiko Sho, Kobe, Japan

[21] Appl. No.: 914,597

[22] Filed: Jul. 20, 1992

[51] Int. Cl.$^5$ .............................................. F25D 13/06
[52] U.S. Cl. ................................................ 62/63; 62/374
[58] Field of Search ..................................... 62/63, 374

[56] References Cited

U.S. PATENT DOCUMENTS

| | | | |
|---|---|---|---|
| 2,287,825 | 6/1942 | Postlewaite | 62/63 |
| 3,722,077 | 3/1973 | Armstrong | 62/374 |
| 4,000,625 | 1/1977 | Beerens et al. | 62/63 |
| 4,040,269 | 8/1977 | Norblad et al. | 62/374 |
| 4,212,171 | 7/1980 | Soecknick | 62/63 |

Primary Examiner—Ronald C. Capossela
Attorney, Agent, or Firm—Oblon, Spivak, McClelland, Maier & Neustadt

[57] ABSTRACT

Disclosed is a method for cooling a coated wire including: preparing a water storage tank disposed between an extruder for coating a core wire with an insulating material and for feeding the coated wire forwardly, and a winder for winding the coated wire; and passing the coated wire before being wound through still water in the water storage tank thereby rapidly cooling the coated wire, the improvement comprising: preparing trough members disposed between the water storage tank and the extruder along the advance direction of the coated wire in such a manner as to cover the coated wire from the underside; and cooling the coated wire by water which is discharged to the trough members and is made to flow therein and thereafter passing the coated wire through the water storage tank. Using the above method, even in manufacture of an insulated wire having a coated outside diameter of 1 mm or less, it is possible to suppress the surface roughness of the coated wire in the degree of at least 1 μm.

2 Claims, 8 Drawing Sheets

METHOD AND DEVICE FOR COOLING COATED WIRE

BACKGROUND OF THE INVENTION

1. Field of the Invention

The present invention relates to a method and device for cooling an insulated wire, that is, a coated wire in manufacture thereof.

2. Description of the Related Art

FIG. 17 shows a conventional insulated wired manufacturing equipment for coating a conductive core wire with an insulating material such as synthetic resin or the like. As shown, the insulated wire manufacturing equipment includes a core wire feeding device 31, a drawing device 32, a core wire softening device 33, a core wire pre-heating device 34, an extruder 35 having a cross head for coating a core wire with an insulating material at the extreme end, a cooling device 36 for cooling a coated wire, a dancer roller device 37, and a winder 38, wherein the above devices are disposed in a line in that order.

In this insulated wire manufacturing equipment, the cooling device 36 includes a water storage tank 39 movable in the wire advance direction, main water tank 41 containing a plurality of shower nozzles 40, and a cooling capstan 42 for air cooling. In this cooling device 36, a coated wire 43 fed from a conventional extruder 35 is made to pass through still water in the water storage tank 39 while being dipped therein, to be thus rapidly cooled. After that, it is further cooled by water sprayed through shower nozzles 40 and is then air-cooled at the cooling capstan 42. Accordingly, the coated wire is first cooled in the water storage tank having the largest cooling effect, after which it is further cooled in the order of weakening effect on cooling.

The reason why the water storage tank 39 having the largest cooling effect is first disposed among the above cooling means is as follows: namely, it has been considered that an insulating material formed on the surface of the coated wire 43 fed from the extruder 35 must be early solidified for preventing the insulating material from being peeled in a process of being wound around the winding means such as the cooling capstan 42 and the dancer roller device 37.

However, as the demands for finer insulated wires and the high production rate thereof has been enhanced, the conventional manufacturing equipment has encountered in the following problem: for example, in manufacturing fine wires having a coated outside diameter of 1 mm or less, the surface roughness often exceeds 10 μm, and consequently, in a process of twisting the number of coated wires, they are rubbed with each other thereby causing cutting-off of the coated surfaces, further in the very worst case, they are reduced in the coated amounts in the degree of exerting adverse effect on the insulating property.

The present inventor has examined and found the fact that such deterioration of the surface roughness is due to the above-mentioned cooling device 36, especially, the water storage tank 39 constituting the rapid cooling stage. Namely, the rapid cooling of the coated wire 43 in the water storage tank 39 is required for solidifying the surface: however, the rapid cooling causes huge thermal shock. In a fine coated wire, such thermal shock causes a thermal stress difference between the core and the coating material, which makes the surface roughness larger in the non-negligible degree.

SUMMARY OF THE INVENTION

Taking the above into consideration, the object of the present invention is to provide a method and device for cooling a coated wire capable of suppressing the surface roughness at a low degree even in manufacturing the fine wire having a coated outside diameter of 1 mm or less.

To achieve the above object, in a first aspect of the present invention, there is provided a method for cooling a coated wire including: preparing a water storage tank disposed between an extruder for coating a core wire with an insulating material and for feeding the coated wire forwardly and a winder for winding the coated wire; and passing the coated wire before being wound through still water in the water storage tank thereby rapidly cooling the coated wire, the improvement comprising: preparing trough members disposed between the water storage tank and the extruder along the advance direction of the coated wire in such a manner as to cover the coated wire from the underside; and cooling the coated wire by water which is discharged to the trough members and is made to flow therein and then passing the coated wire through the water storage tank.

Furthermore, in a second aspect of the present invention, there is provided a cooling device for cooling a coated wire including a water storage tank disposed between an extruder for coating a core wire with an insulating material and for feeding the coated wire forwardly and a winder for winding the wire coated, whereby passing the coated wire before being wound through still water in the water storage tank for rapidly cooling the coated wire, the improvement comprising: a cooling means provided between the water storage tank and the extruder, which includes trough members disposed along the advance direction of the coated wire passing between the water storage tank and the extruder in such a manner as to cover the coated wire from the underside for cooling the coated wire by water which is discharged to the trough members and is made to flow therein.

Prior to the detailed description of the preferred embodiments, there will be explained the function of the present invention.

In the trough member, the cooling of the coated wire is performed by water flowing within the trough member. Namely, in the trough member, cooling water does not usually cover the coated wire differently from the cooling by the water storage tank. Accordingly, the cooling effect of the trough member is lower than the water storage tank, and is higher than the water-spraying at the shower nozzles.

The present invention has a feature of cooling the coated wire at the trough member having such an intermediate cooling effect disposed at the head of the cooling means, and then rapidly cooling it at the water storage tank. Namely, the coated wire first cooled by the trough member is inferior in the surface solidified state to that in the conventional manner; but is surface-solidified sufficiently to suppress the thermal stress difference which causes deterioration of surface roughness. Thus, in the next stage, the coated wire is earnestly solidified by rapid cooling at the water storage tank; however, since being almost formed in its surface shape by cooling at the trough member, it is less liable to be affected in surface roughness by rapid cooling.

DETAILED DESCRIPTION OF THE PREFERRED EMBODIMENTS

Figure 1:
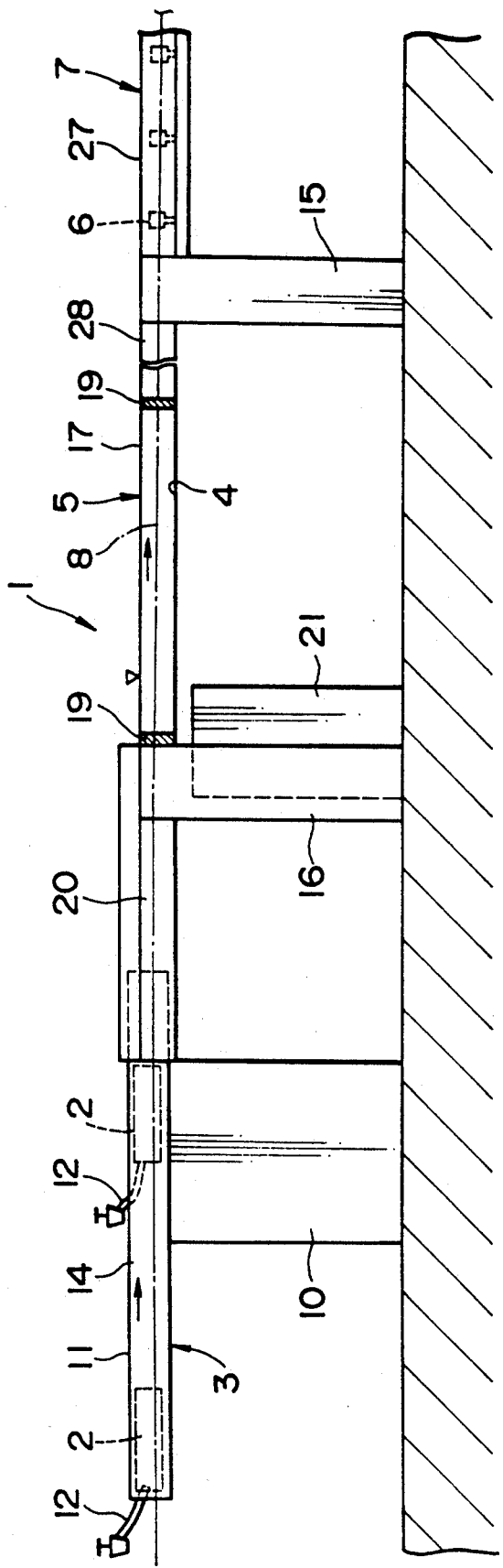
FIG. 1 is a side view of a cooling device according to one embodiment of the present invention.
Figure 2:
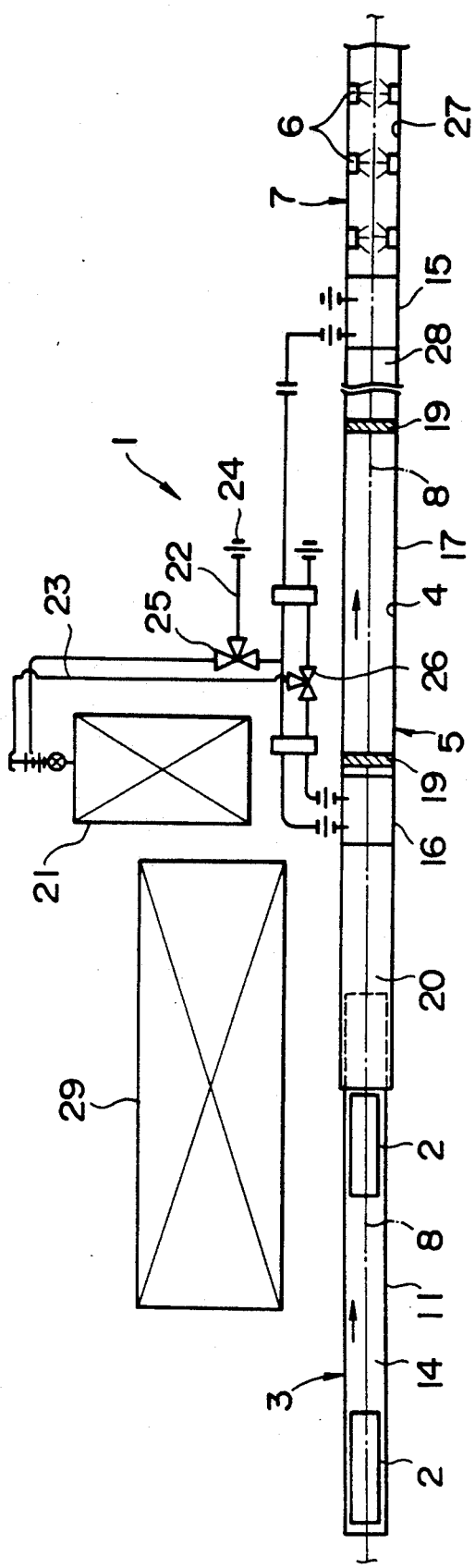
FIG. 2 is a plan view of FIG. 1.
Figure 17:
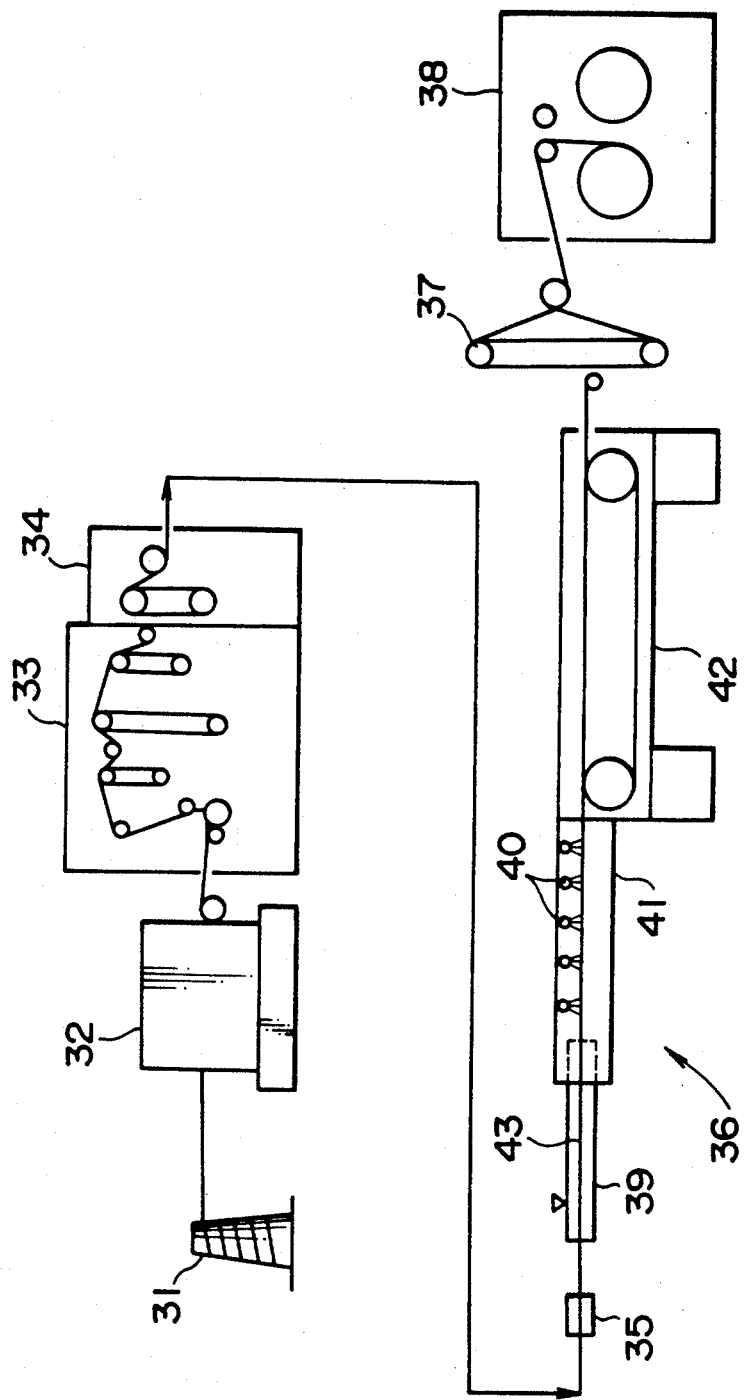
FIG. 17 is a schematic view of an insulated wire manufacturing equipment including a conventional cooling device.

Hereinafter, one embodiment of the present invention will be described in detail with reference to the accompanying drawings:

Referring to FIGS. 1 and 2, reference numeral 1 shows a cooling device for cooling a coated wire according to the embodiment. The cooling device 1 includes a first cooling means 3 containing V-shaped troughs 2, second cooling means 5 composed of a water storage tank 4, and a third cooling means 7 having a plurality of nozzles 6 therein, wherein the cooling means 3, 5 and 7 are linearly disposed in the advance direction of the coated wire 8 (from left to right in FIG. 1) in that order. In addition, an extruder (not shown) for coating a core wire with an insulating material is disposed in back of the first cooling means 3 (on the left in FIG. 1), and a winder (not shown) is disposed in front of the third cooling means 7 (on the right in FIG. 1) through a cooling capstan or the like, wherein the dispositions and constructions thereof are the same as in the conventional equipment (see FIG. 17).

The first cooling means 3 includes a receiving member 11 formed in a U-shape in section which is mounted on a mounting base 10 in such a manner as to be movable in the advance direction of the coated wire 8, and two V-troughs 2 and 2 contained in the receiving member 11 on the front and rear sides respectively so as to be opened upwardly. Water discharge pipes 12 and 12 are respectively provided on the upper rear sides of the V-troughs 2 and 2.

Figure 3:
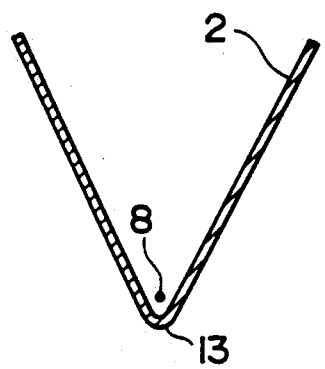
FIG. 3 is a cross-sectional view of a V-trough.
Figure 4:
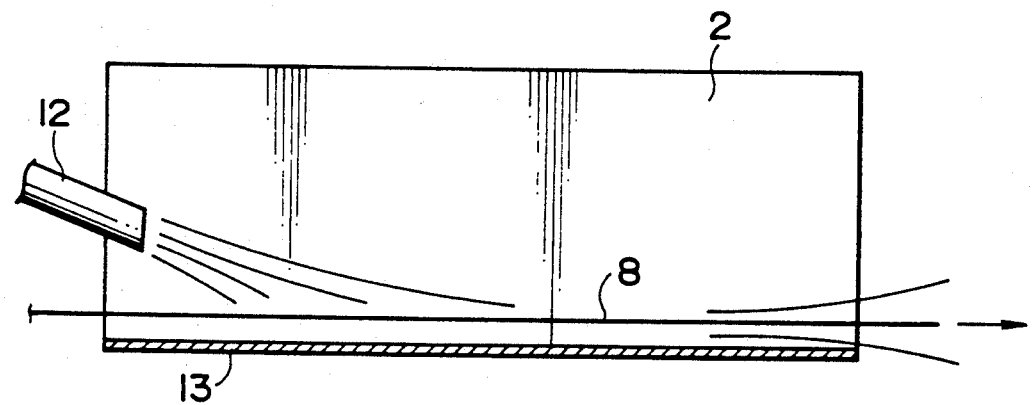
FIG. 4 is a cross-sectional side view of FIG. 3.
Figure 5:
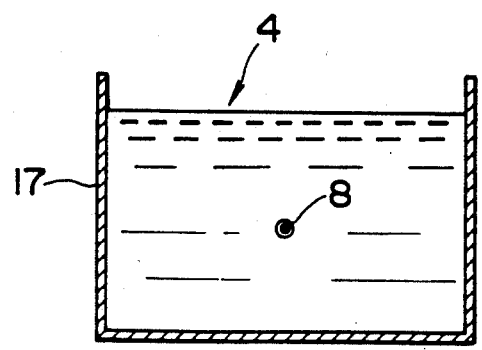
FIG. 5 is a cross-sectional view of a water storage tank.
Figure 6:
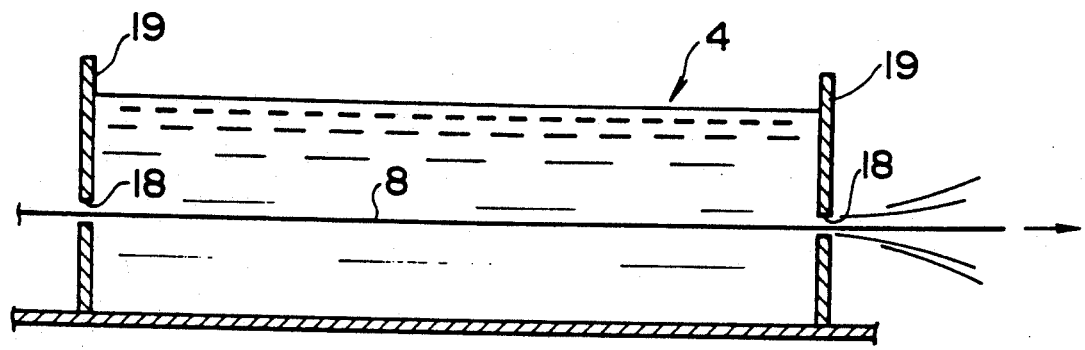
FIG. 6 is a cross-sectional side view of the water storage tank as shown in FIG. 5.

As shown in FIGS. 3 and 4, each of the V-troughs 2 and 2 is disposed along the advance direction of the coated wire 8 to cover the coated wire 8 from the underside and to position the coated wire 8 in the vicinity of the lower corner portion 13 thereof. Accordingly, the coated wire 8 fed from the extruder first advances along the vicinity of the lower corner portion 13 in the V-trough 2, to be thereby cooled by water which is discharged from the water discharge pipe 12 and is made to flow ahead at the lower portion in the V-trough 2. Incidentally, reference numeral 14 indicates an air cooling zone disposed between the V-troughs 2 and 2.

The second cooling means 5 is composed of a water storage tank 4 including two columns 15 and 16, and a water tank 17 formed into a U-shape in section installed between the columns 15 and 16. The water tank 17 contains in an internal space section thereof two partition walls 19 and 19, each having a hole 18 through which the coated wire 18 passes. The partition walls 19 and 19 are movable in the longitudinal direction to adjust the longitudinal length of the water storage tank 4, thereby making it possible to change the length of the rapid cooling zone for the coated wire 8. Also, the receiving member 11 is freely moved in the longitudinal direction and is fitted on the rear end side of the water tank 17, and further, the fitting lapping length is designed to be changed thereby making it possible to change the length of an air cooling zone 20 between the first and second cooling means 3 and 5.

Reference numeral 21 indicates a calorifier for keeping the water temperature in the water storage tank 4 constant and is connected between the front and rear columns 15 and 16 through a cold water piping 22 and hot water piping 23. Namely, cold water fed from a supply port 24 of the cold water piping 22 is supplied to the three ways to the columns 15 and 16, and the hot water tank 21 at respective constant amounts through a three-way valve 25. The hot water from the hot water tank 21 is supplied to the rear column 16 at a constant amount through a three-way valve 26 in the hot water piping 23. Thus, by the balance of the supplied amounts of cold water and hot water, the water temperature in the water storage tank 4 is kept constant. Incidentally, the piping passing through the columns 15 and 16 is naturally inserted into the water storage tank 4.

Figure 7:
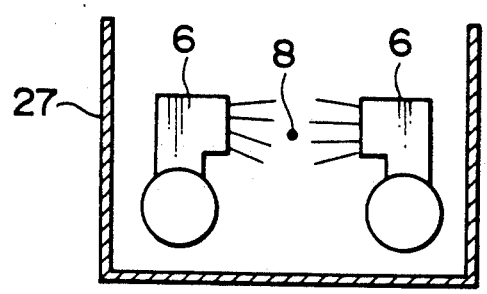
FIG. 7 is a cross sectional view of a third cooling means (shower-type)
Figure 8:
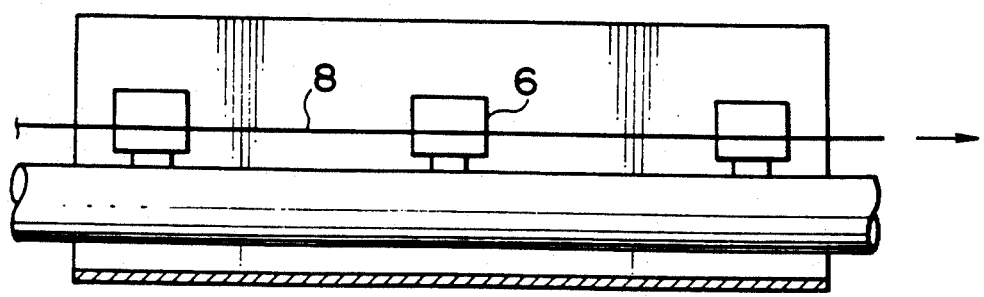
FIG. 8 is a cross-sectional side view of the third cooling means as shown in FIG. 7.
Figure 9:
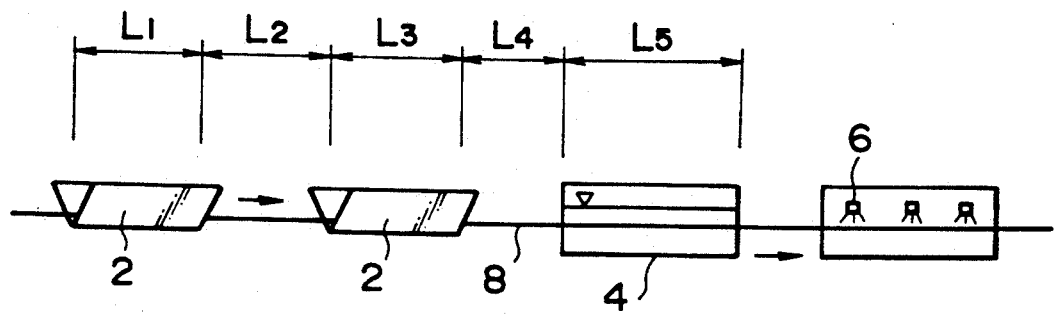
FIG. 9 is an explanatory view for Example 1.

The third cooling means 7 includes a water tank 27 formed into a U-shape in section disposed in front of the front column 15, and a plurality of shower nozzles 6 provided on the side wall of the water tank 27 so as to be crosswise opposed to each other. Accordingly, the coated wire 8 rapidly cooled by the second cooling means 5 advances to this third cooling means 7 through the air cooling zone 28 directly after the rear partition wall 19, and is cooled by water sprayed from the right and left shower nozzles 6 as shown in FIGS. 7 and 8. In addition, reference numeral 29 indicates a control panel for controlling moving amount of the receiving member 11 and temperature change by the hot water tank 21.

With this construction, since the coated wire 8 is cooled at the V-troughs 2 and 2 inferior in the cooling effect to the water storage 4 prior to the water storage tank 4, and is then rapidly cooled in the water storage tank 4, it is possible to suppress the surface roughness of the fine wire having a diameter of 1 mm or less in the degree lower than in the conventional manner.

Namely, the cooling function of the V-trough 2 lies in that the coated wire 8 is cooled with water flowing therein, and consequently, is quite different from that of the water storage tank 4 in which the coated wire 8 is cooled with cooling water always covering the circumference thereof. Furthermore, in the V-trough 2, the flowing water can sufficiently wet the circumference of the coated wire 8 compared with the water-spraying from the shower nozzles 6. Consequently, the cooling of the V-trough 2 has an intermediate cooling effect between those of the water storage tank 4 and the shower nozzles 6. Therefore, since the V-trough 2 somewhat solidifies the surface of the coated wire 8 before rapid cooling by the water storage tank 4, it is possible to significantly reduce deterioration of the surface roughness caused by the thermal stress difference in comparison with the conventional manner.

Furthermore, in this embodiment, since the air cooling zones 14 and 20 are respectively provided between the V-troughs 2 and 2, and between the first cooling means 3 (V-trough 3) and the water storage tank 4, the surface solidification by cooling and the heat transmission of inner heat in the air cooling zones 14 and 20 to the surface side are repeated. This equalizes the thermal stress thus more effectively preventing deterioration of the surface roughness.

The present invention is more particularly described by way of examples.

In the examples, comparison between various cooling methods were made using the following coated wire 8:

Coated outside diameter: Φ 0.86 mm (core wire diameter: Φ 0.40)
Coating material: HDPE (high density polyethylene)

(1) EXAMPLE 1 (SEE FIG. 9)

Cooling method: V-trough + V-trough + water storage tank + shower

Figure 10:
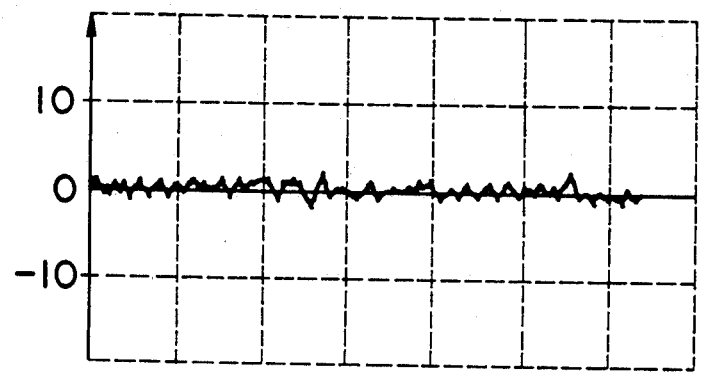
FIG. 10 is a graph showing results of Example 1.
Figure 11:
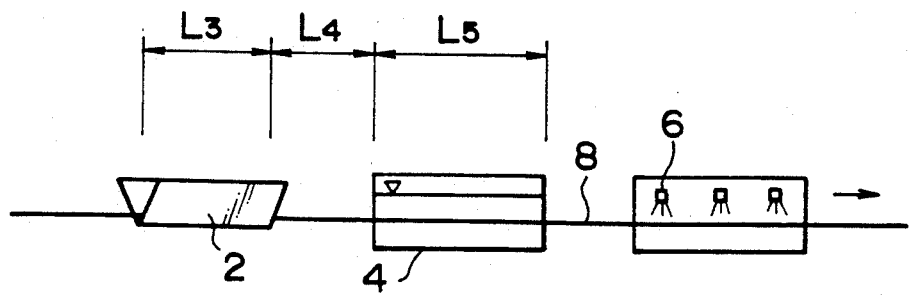
FIG. 11 is an explanatory view for Example 2.

Lengths $L_1$, $L_3$ of respective V-troughs 2, 2: 50 cm
Length $L_2$ of air cooling zone between V-troughs 2, 2: 100 cm
Length $L_4$ of air cooling zone between V-trough 2 and water storage tank 4: 100 cm
Length $L_5$ of water storage tank 4: 100 cm Under the above cooling condition, the coated wire 8 was manufactured. As a result, the surface roughness of the coated wire 8 is approximately within the range from 5 to 6 μm as shown in FIG. 10. Incidentally, in this figure, the abscissa indicates the length of the coated wire 8, and the unit length is 10 mm (which are common in FIGS. 12, 14 and 16).

(2) EXAMPLE 2 (SEE FIG. 11)

Cooling method: V-trough + water storage tank + shower

Figure 12:
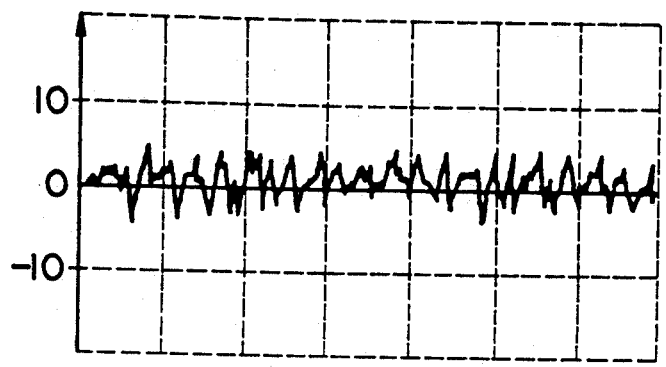
FIG. 12 is a graph showing results of Example 2.
Figure 13:
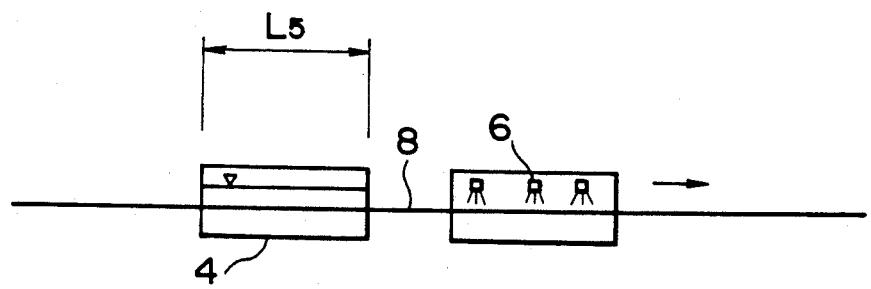
FIG. 13 is an explanatory view for Example 3.

Length $L_3$ of V-trough 2: 50 cm
Length $L_4$ of air cooling zone: 100 cm
Length $L_5$ of water storage tank 4: 100 cm Under the above cooling condition, the coated wire 8 was manufactured. As a result, the surface roughness of the coated wire 8 is approximately within the range from 8 to 9 μm as shown in FIG. 12, which is less than the target value of 10 μm.

(3) EXAMPLE 3 (SEE FIG. 13)

Figure 14:
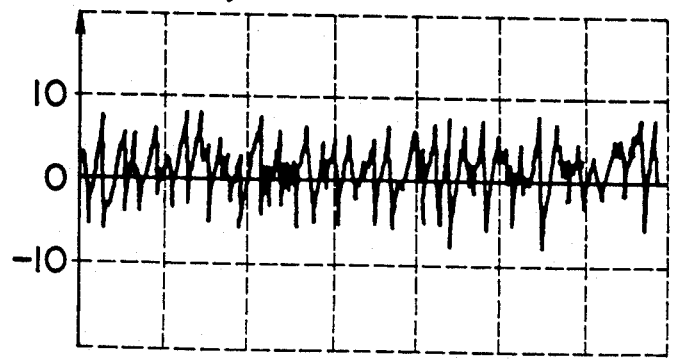
FIG. 14 is a graph showing results of Example 3.
Figure 15:
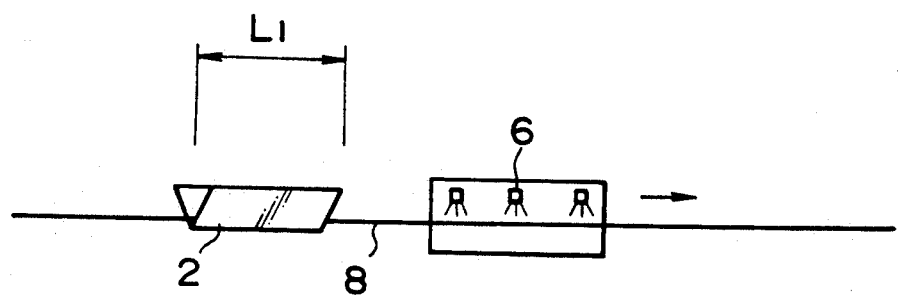
FIG. 15 is an explanatory view for Example 4.

Cooling method: Water storage tank + shower
Length $L_5$ of water storage tank 4: 100 cm Under the above cooling condition, the coated wire 8 was manufactured. As a result, the surface roughness of the coated wire 8 is approximately within the range from 14 to 15 μm as shown in FIG. 14, which exceeds the target value of 10 μm.

(4) EXAMPLE 4 (SEE FIG. 15)

Cooling method: V-trough + shower

Length $L_1$ of V-trough 2: 50 cm

Figure 16:
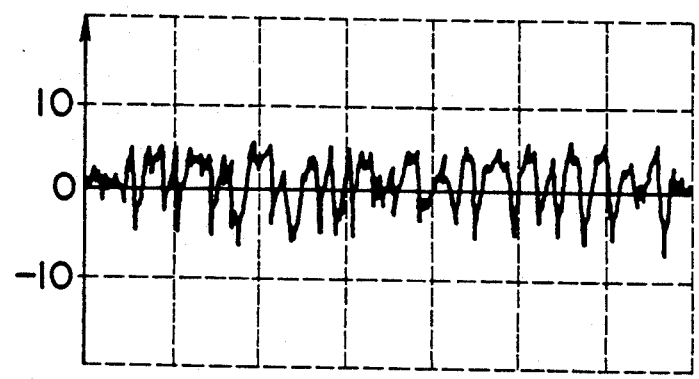
FIG. 16 is a graph showing results of Example 4.

Under the above cooling condition, the coated wire 8 was manufactured. As a result, the surface roughness of the coated wire 8 is approximately within the range from 12 to 13 μm as shown in FIG. 16, which exceeds the target value of 10 μm.

(5) OTHERS

Futhermore, experiments were repeated in various cooling methods other than the above methods, such as, water storage tank + water storage tank, air cooling + shower, steam cooling + water storage tank, air cooling + water storage tank. As a result, in either experiments, the surface roughness exceeds the target value of 10 μm.

From the above Examples, it is revealed that the pattern of disposing a number of V-troughs directly before the water storage tank 4 is most effective. Furthermore, from the difference between Example 1 and 2, it is also revealed that surface roughness is effectively reduced by repetition of the cooling by V-troughs and air cooling thereby achieving somewhat equalization of thermal stress and surface solidification, before rapid cooling by the water storage tank 4.

In addition, the present invention is not limited to the above embodiment. The trough may be formed into such a shape as generating a constant water flow in a space section, for example, a U-shape or semi-circular or the like.

What is claimed is:

1. In a method for cooling a coated wire including: preparing a water storage tank disposed between an extruder for coating a core wire with an insulating material and for feeding said coated wire forwardly and a winder for winding said coated wire; and passing said coated wire before being wound through still water in said water storage tank thereby rapidly cooling said coated wire, the improvement comprising:
    preparing trough members disposed between said water storage tank and said extruder along the advance direction of said coated wire in such a manner as to cover said coated wire from the underside; and
    cooling said coated wire by water which is discharged to said trough members and is made to flow therein, and then passing said coated wire through said water storage tank.

2. In a cooling device for cooling a coated wire including a water storage tank disposed between an extruder for coating a core wire with an insulating material and for feeding said coated wire forwardly and a winder for winding said wire coated, whereby passing said coated wire before being wound through still water in said water storage tank for rapidly cooling said coated wire, the improvement comprising:
    a cooling means provided between said water storage tank and said extruder, which includes trough members disposed along the advance direction of said coated wire passing between said water storage tank and said extruder in such a manner as to cover said coated wire from the underside for cooling said coated wire by water which is discharged to said trough members and is made to flow therein.

* * * * *